United States Patent
Bae (10) Patent No.: US 10,006,713 B2
(45) Date of Patent: Jun. 26, 2018

(54) APPARATUS AND METHOD FOR PROCESSING FINAL EFFLUENT AND PALM BY-PRODUCTS DISCHARGED FROM PALM OIL MILLING PROCESS

(71) Applicants: IL-SUNG CONSTRUCTION CO., LTD., Incheon (KR); Hee Dong Bae, Suwon-si, Gyeonggi-do (KR)

(72) Inventor: Hee Dong Bae, Suwon-si (KR)

(73) Assignee: IL-SUNG Construction Co., Ltd. (KR)

( * ) Notice: Subject to any disclaimer, the term of this patent is extended or adjusted under 35 U.S.C. 154(b) by 343 days.

(21) Appl. No.: 14/798,754

(22) Filed: Jul. 14, 2015

(65) Prior Publication Data

US 2015/0345864 A1 Dec. 3, 2015

Related U.S. Application Data (63) Continuation of application No. PCT/KR2013/007620, filed on Aug. 26, 2013.

(30) Foreign Application Priority Data

Jan. 16, 2013 (KR) .................. 10-2013-0004867

(51) Int. Cl.
| | |
|---|---|
| F26B 19/00 | (2006.01) |
| F26B 23/00 | (2006.01) |
| C02F 1/02 | (2006.01) |
| C02F 9/00 | (2006.01) |
| F26B 20/00 | (2006.01) |
| C02F 103/26 | (2006.01) |
| C02F 1/52 | (2006.01) |
| C02F 11/12 | (2006.01) |

(Continued)

(52) U.S. Cl.
CPC .............. *F26B 23/002* (2013.01); *C02F 1/02* (2013.01); *C02F 9/00* (2013.01); *F26B 20/00* (2013.01); *C02F 1/52* (2013.01); *C02F 1/66* (2013.01); *C02F 1/74* (2013.01); *C02F 11/12* (2013.01); *C02F 2001/007* (2013.01); *C02F 2103/26* (2013.01); *C02F 2103/322* (2013.01); *C02F 2303/10* (2013.01); *Y02W 10/30* (2015.05)

(58) Field of Classification Search
CPC .............. F26B 2200/00; F26B 2200/02; F26B 2200/04; F26B 2200/10; F26B 2200/18; C02F 1/66; C02F 1/52; C02F 1/02; C02F 9/00; C02F 11/08; C02F 11/14
USPC ........................................ 34/478, 479, 86
See application file for complete search history.

(56) References Cited

FOREIGN PATENT DOCUMENTS

| KR | 1996-0040437 A | 12/1996 |
|---|---|---|
| KR | 10-0534151 B1 | 11/2005 |

(Continued)

OTHER PUBLICATIONS

International Search Report (PCT/KR2013/007620), WIPO, Dec. 3, 2013.

*Primary Examiner* — John McCormack
(74) *Attorney, Agent, or Firm* — Park & Associates IP Law, P.C.

(57) ABSTRACT

The present invention is to produce fuel and feed resources by rapidly separating solid contents from final effluent and palm by-products which are discharged from the palm oil milling process, oxidizing organics from the generated liquid phase contents through water treatment so as to use the result as a liquid fertilizer, and carrying out continuous (Continued)

concentration and dehydration of the separated solid contents and then mixing the result with palm oil decanter cake and the like.

7 Claims, 2 Drawing Sheets

(51) Int. Cl.
*C02F 1/66* (2006.01)
*C02F 103/32* (2006.01)
*C02F 1/74* (2006.01)
*C02F 1/00* (2006.01)

(56) References Cited

FOREIGN PATENT DOCUMENTS

| KR | 20-0425442 Y1 | 8/2006 |
| KR | 10-2009-0111979 A | 10/2009 |
| KR | 10-0938490 B1 | 1/2010 |
| KR | 10-2012-0126460 A | 11/2012 |
| KR | 10-1212334 B1 | 12/2012 |

APPARATUS AND METHOD FOR PROCESSING FINAL EFFLUENT AND PALM BY-PRODUCTS DISCHARGED FROM PALM OIL MILLING PROCESS

REFERENCE TO RELATED APPLICATIONS

This is a continuation of pending International Patent Application PCT/KR2013/007620 filed on Aug. 26, 2013, which designates the United States and claims priority of Korean Patent Application No. 10-2013-0004867 filed on Jan. 16, 2013, the entire contents of which are incorporated herein by reference.

FIELD OF THE INVENTION

The present invention relates to techniques capable of producing dried and solid renewable energy sources using the process water generated in the process of extracting palm oils from palm kernels. The present invention relates to an apparatus and a method for processing final effluent and palm by-products discharged from the palm oil milling process, which allow to produce dried and solid renewable energy sources and feed resources according to complex energy contents by rapidly separating solid contents from final effluent which is discharged from the palm oil milling process, oxidizing organics from the generated liquid phase contents through water treatment so as to use the result as a liquid fertilizer for the palm, carrying out continuous concentration and dehydration of the separated solid contents to a water content of 75% or less, and mixing the result with palm oil decanter cake (PODC), palm kernel cake (PKC) and palm kernel shell (PKS).

BACKGROUND OF THE INVENTION

Oil palms, which are plants that grow in tropical zones including Malaysia, are crops for the production of oils. The cultivation areas for oil palms have fast expanded.

In particular, recently, the cultivation areas thereof have sharply extended to Mexico as well as Africa. As the areas for oil palms have extended to South China, the cultivation areas and the use thereof are becoming larger than canola as well as soybeans, which are legumes.

Oil palms are processed by milling to obtain oils. Herein, during the milling process, much steam is introduced, thereby generating condensed water with a high temperature of about 80° C. And, since it is compressed at a high pressure in the oil milling process, water contained in plants also flows out, so that large amounts of solid contents are discharged as the process water.

However, there is no proper method for processing such process water since the process water is discharged at a high concentration. For this reason, so far, most palm oil mill factories have been using illegal discharging methods in combination with a method of naturally evaporating the process water using ponds. However, these methods are causing immense problems such as air pollution as well as serious soil pollution and water pollution, so it can no longer be ignored.

Furthermore, in addition to the final effluent (POME) which is discharged from the palm oil milling process, palm by-products such as palm oil decanter cake (PODC), palm kernel shell (PKC), palm kernel cake (PKS), etc. are produced in the palm oil milling process. Such substances have been used as fuel for existing mill factories to produce steam. However, since these substances are voluminous and hard to process, there are many problems.

For the technique for processing palm oil mill waste, "Method for Preparing Biofertilizer Using Palm Oil Mill Wastage" (Korean Patent No. 10-0938490; Patent Document 1) introduces a process of carbonizing kernel shell, incinerating EFB, treating POME with micro air bubbles and filtering the treated POME to obtain decanter cake, mixing them, and maturing the mixture to produce a biofertilizer.

However, the above technique has a problem that since kernel shell, fruit bunch, etc. are carbonized and incinerated, respectively, the consumption of energy sources occurs accordingly.

In addition, the above technique does not provide a method for processing palm kernel cake or palm oil decanter cake, etc. out of the by-products.

As such, up to now, not only it is very difficult to process final palm oil milling process water, but also the process water cannot be processed by existing water treatment methods; thus, a method of allowing the process water to sequentially remain in dozens of large ponds for a long time (about 60 to 120 days) to evaporate it or illegally releasing the process water has been taken. However, the process water heavily decays, which causes the occurrence of an offensive odor, resulting in air pollution, etc.

In particular, the method of converting the generated final palm oil process water into waste water and processing it using ponds (Ponding process) has problems in that it requires large areas of land and is difficult to control, and that deposited substances should be removed continuously every year. Recently, in Europe, techniques of producing biogas have been introduced. However, it takes long time for the digestion to produce biogas, and the amounts of the produced biogas are not constant. Also, even if some biogas is produced, since the waste water finally discharged after producing the biogas contains a high concentration of nitrogen, the cost for processing the waste water is huge. For this reason, these techniques have not been widely used yet, and most of the techniques have failed and have not come close to practical use.

Furthermore, it is hard to process the PODC because its production amounts are large and the water contents are high. Thus, a method of fermenting the PODC to produce a fertilizer has been used. The PKS has been used as fuel, but there is difficulty in obtaining economic efficiency because the water contents and the volume are large. The PKC has been partly used as feed resources, but this could not be a long-term treatment method because of the difficulty in marketability due to changes in quality, etc. Consequently, these substances are just released in large areas of open-air yards. Accordingly, there are many difficulties in solving such problems.

SUMMARY OF THE INVENTION

The apparatus and method for processing final effluent and palm by-products discharged from a palm oil milling process according to the present invention are to solve the problems of the conventional technologies, by processing palm oil decanter cake (PODC) and palm kernel cake (PKC) in addition to palm oil mill effluent (POME), which is finally discharged from the palm oil milling process, and palm kernel shell (PKS) collectively to produce renewable energy sources for combustion and liquid fertilizers, thereby increasing the processing efficiency of the waste and allowing it to be used as energy sources and feed resources to gain productivity.

More specifically, the present invention is to use the substances as renewable energy sources by recovering the waste heat of the POME discharged at a high temperature using a heat exchanger, separating floating solid contents contained in the cooled POME, storing liquid phase contents and carrying out the aeration process to use the result as a liquid fertilizer of other plants such as palm, and concentrating sludge which was subject to the separation of solid contents, and dehydrating it to have a water content of 75% or less, mixing the result with the PODC, the PKS and the PKC, and pelletizing it.

Furthermore, the present invention is to have high removal rates as compared to the original waste water, by floating, in a pressurized floating tank, non-coagulated suspended materials remaining in the separated liquid phase contents discharged after the concentration and dehydration steps, and removing the suspended materials using a scraper.

According to one aspect of the present invention so as to accomplish these objects, there is provided to an apparatus for processing final effluent and palm by-products discharged from a palm oil milling process, including: a POME storage tank in which palm oil mill effluent (POME), which is finally discharged from the palm oil milling process, is introduced and stored; an effluent storage tank being connected by piping to the POME storage tank and configured to receive and store the POME, wherein a heat exchanger is installed on its pipeline so as to recover the waste heat of the POME; a concentrator being connected by piping to the effluent storage tank and configured to receive and concentrate the POME, wherein a neutralizing agent dissolution tank in which a neutralizing agent is dissolved and stored, and a coagulating agent dissolution tank in which a coagulating agent is dissolved and stored are connected by piping on its pipeline, so that the concentration is carried out while receiving the neutralizing agent and the coagulating agent, wherein the liquid phase contents and the sludge are separated from the POME; a dehydrator being connected to the concentrator and configured to dehydrate the sludge in the concentrated POME to produce a POME decanter cake, wherein the liquid phase contents are separated from the sludge; a pressurized floating tank one side of which being connected by piping to the concentrator and other side of which being connected by piping to the dehydrator, the pressurized floating tank being configured to store the liquid phase contents in the POME, which was separated by the concentrator and the dehydrator, wherein on its pipeline, the coagulating agent dissolution tank is connected to receive the coagulating agent, and on its upper part, a suspended material scraper is installed to remove suspended materials; an aeration tank being connected to the pressurized floating tank and configured to oxide organics while aerating the liquid phase contents purified through the pressurized floating tank to produce a liquid fertilizer, wherein a liquid fertilizer storage tank is connected at its one side to store the produced liquid fertilizer therein; a decanter cake storage tank being connected to the dehydrator and configured to store the POME decanter cake produced at the dehydrator; a PKS storage tank in which palm kernel shell (PKS) is stored; a PODC storage tank in which palm oil decanter cake (PODC) is stored; a PKC storage tank in which palm kernel cake (PKC) is stored; a mixer being connected to the decanter cake storage tank, the PKS storage tank, the PODC storage tank, and the PKC storage tank and configured to mix the POME decanter cake, the PKS, the POD, the PKC; a screen being connected to the mixer and configured to sort impurities from the raw materials supplied from the mixer; a pelletizer configured to pelletize the raw material that has passed through the screen; a dryer configured to receive the pellets from the pelletizer and dry the pellets; a hot air blower being connected at its one side to the heat exchanger to supply the waste heat of the POME and having the other side, in which external air is introduced, wherein the heat generated by combusting fuel is supplied to the dryer; and a multi-cyclone one side of which being connected to a scrubber and other side of which being connected to the dryer, the multi-cyclone being configured to separate and discharge water and dust from the air including water and dust discharged from the dryer.

At this time, the apparatus for processing final effluent and palm by-products discharged from a palm oil milling process further including: a pellet pulverizing device configured to pulverize the pellet discharged from the dryer; and a powder storage tank configured to store the pulverized pellet, characterized in that the powder storage tank is connected to the mixer so as to further mix the pulverized pellet at the mixer.

Also, there is provided to a method for processing final effluent and palm by-products discharged from a palm oil milling process, including: a cooling step of recovering and cooling the waste heat of the palm oil mill effluent (POME), which is finally discharged from the palm oil milling process, using a heat exchanger; a neutralizing step of adding a neutralizing agent into the cooled POME to adjust pH; a coagulating agent adding step of adding a coagulating agent into the POME with adjusted pH; a concentration step of concentrating the POME into which the coagulating agent is added, wherein during the concentration process, the liquid phase contents are primarily separated from the POME; a dehydration step of dehydrating the POME passing through the concentration step to produce a POME decanter cake with a water content of 70 to 80%, wherein the liquid phase contents are secondarily separated; a suspended material removal step of supplying the coagulating agent to the liquid phase contents primarily separated at the concentration step and the liquid phase contents secondarily separated at the dehydration step so as to add it to the pressurized floating tank 11 to remove suspended materials; a liquid fertilizer production step of oxidizing organics while aerating the liquid phase contents, in which the suspended materials are removed, for 3 to 7 days to produce a liquid fertilizer; a mixing step of mixing palm kernel shell (PKS), palm oil decanter cake (PODC), and palm kernel cake (PKC) with the POME decanter cake produced at the dehydration step; a pelletizing step of sorting impurities from the mixed raw materials and pelletizing them to be pelletized; and a drying step of drying the pellet produced at the pelletizing step.

Here, the method for processing final effluent and palm by-products discharged from a palm oil milling process further includes pulverizing the pellet dried at the drying step and is characterized in that the pulverized pellet powders are mixed at the mixing step to have a water content of 40 to 60%.

Also, the drying step is performed by generating hot air by receiving external air and fuel and combusting the fuel, and the hot air, the waste heat of the POME discharged through the heat exchanger, and the waste heat generated at a palm oil mill factory are mixed and used for drying at the dryer, wherein the temperature of the mixed hot air is 50 to 150° C., and the relative humidity is 0 to 60%.

Also, the method for processing final effluent and palm by-products discharged from a palm oil milling process is characterized in that in the neutralizing step, the neutralizing agent mixes and stirs the POME with any one selected from caustic soda, calcium hydroxide, calcium oxide, limestone, bentonite zeolite, and calcium hydroxide through a line mixer.

Also, the method for processing final effluent and palm by-products discharged from a palm oil milling process is characterized in that the POME decanter cake consists of the sludge having at least one of the oil content, wherein the POME decanter cake is mixed with the dried pellet powder and alkaline calcium hydroxide and then is pelletizing.

According to the present invention, the renewable energy sources for combustion and the liquid fertilizers are produced by processing palm oil decanter cake (PODC) and palm kernel cake (PKC) in addition to palm oil mill effluent (POME), which is finally discharged from the palm oil milling process, and palm kernel shell (PKS) collectively, so that it increases the processing efficiency of the waste and allowing it to be used as energy sources and feed resources to gain productivity.

More specifically, the present invention is to use the substances as renewable energy sources by recovering the waste heat of the POME discharged at a high temperature using a heat exchanger, separating floating solid contents contained in the cooled POME, storing liquid phase contents and carrying out the aeration process to use the result as a liquid fertilizer of other plants such as palm, and concentrating sludge which was subject to the separation of solid contents, and dehydrating it to have a water content of 75% or less, mixing the result with the PODC, the PKS and the PKC, and pelletizing it.

Furthermore, the present invention is to have high removal rates as compared to the original waste water, by floating, in a pressurized floating tank, non-coagulated suspended materials remaining in the separated liquid phase contents discharged after the concentration and dehydration steps, and removing the suspended materials using a scraper.

In addition, the present application simplifies the process of removing contaminants such as suspended materials, total nitrogen and total phosphorus, etc., which are contained in the liquid phase contents discharged from the POME, and makes it possible to process in real time. In spite of the simplified process and the real-time process ability, the efficiency of removing suspended materials, total nitrogen and total phosphorus is highly superior, and the installation area of the apparatus can be minimized.

BRIEF DESCRIPTION OF THE DRAWINGS

The above and other objects, features and advantages of the present invention will be more apparent from the following detailed description taken in conjunction with the accompanying drawings, in which.

REFERENCE SIGNS LIST

1: POME storage tank
2: heat exchanger
3: effluent storage tank
4: neutralizing agent dissolution tank
5: coagulating agent dissolution tank
6: line mixer
7: concentrator
8: air pressure dehydrator
9: buffer tank
10: line mixer
11: pressurized floating tank
12: buffer tank
13: aeration tank
14: fertilizer storage tank
15: conveyor
16: compression press
17: buffer tank
18: decanter cake storage tank
19: PODC storage tank
20: PKS storage tank
21: pulverizing device
22: pulverized PKS storage tank
23: PKC storage tank
24: powder storage tank
25: mixer
26: screen
27: pelletizer
28: dryer
29: multi-cyclone
30: pellet pulverizing device
31: storage tank
32: hot air blower.

DETAILED DESCRIPTION OF THE INVENTION

The milling process of extracting palm oils from palm kernel generates palm oil mill effluent (POME), which is finally discharged from the palm oil milling process.

In addition, the palm oil milling process generates palm oil decanter cake (PODC) as palm by-products, which is a decanter cake discharged by centrifugal separation from the process water.

Furthermore, the palm oil milling process generates palm kernel shell (PKS), which is made by peeling the outer shell of kernel generated after extracting the palm oils, and palm kernel cake (PKC).

The present invention makes it possible to process the POME, the PODC, the PKS and the PKC integrally or individually, in consideration of their respective properties.

The POME generally contains 3 to 6% of solid contents. Thus, if the solid contents are separated from the POME, the pollution levels such as COD, SS, T-N, T-P would rapidly decrease, and soluble organics in the generated liquid phase contents are easily oxidized, thereby making it possible to rapidly process the organics so as to be used as liquid fertilizers, and the result can be rapidly absorbed in the soil.

In addition, the POME decanter cake in which the solid contents are separated is processed to be used as energy sources for combustion when dried.

The PODC, which is a by-product discharged with water contents of 70% or less and at a temperature of 90° C., is mostly released in open-air yards and used as a fertilizer. However, the present invention makes it possible to use the PODC as raw materials, by analyzing the oil contents and finding its value as energy sources.

The PKS contains high energy but due to its large volume, the cost for processing it is high. Thus, the present invention processes the PKS together so as to use it as an energy source.

Meanwhile, the present invention processes the PKC to use it as an energy source and a water adjusting agent.

Hereinafter, the apparatus and method for processing final effluent and palm by-products discharged from the palm oil milling process according to the present invention will be explained in more detail with reference to the drawings attached herewith.

First, the apparatus for processing final effluent and palm by-products discharged from the palm oil milling process according to the present invention will be explained.

Figure 1:
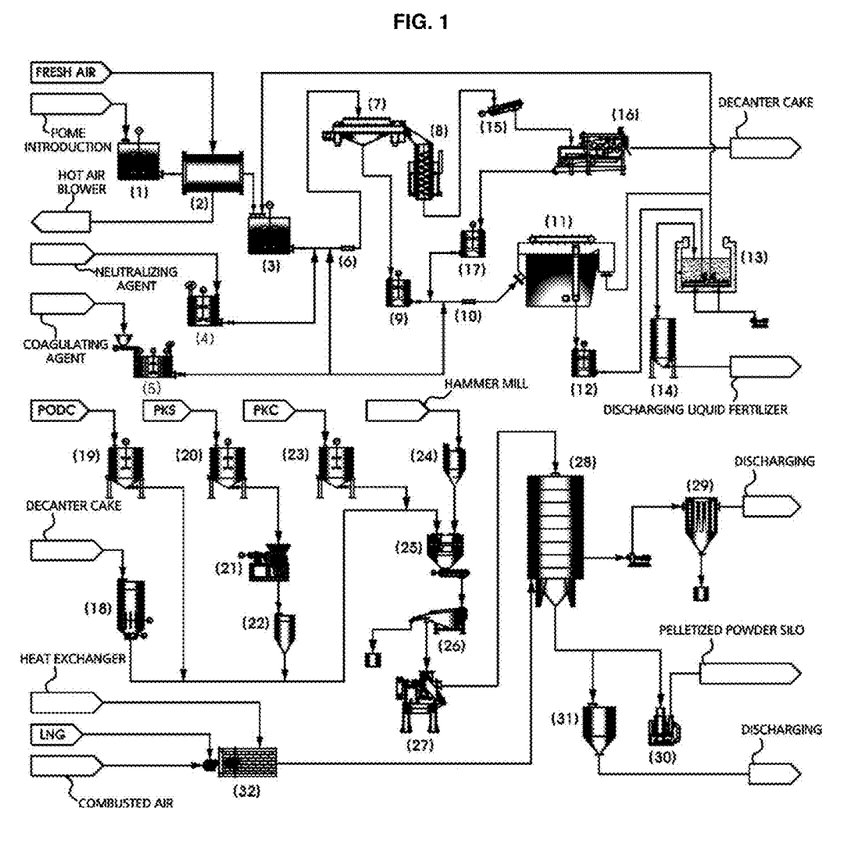
FIG. 1 is a configuration showing an apparatus for processing final effluent and palm by-products discharged from a palm oil milling process according to the present invention.

As illustrated, the processing apparatus according to the present invention comprises a POME storage tank 1, an effluent storage tank 3, a concentrator 7, a dehydrator, a pressurized floating tank 11, an aeration tank 13, a decanter cake storage tank 18, a PKS storage tank 20, a PODC storage tank 19, a PKC storage tank 23, a mixer 25, a screen 26, a pelletizer 27, a dryer 28; a hot air blower 32, and a multi-cyclone 29.

In the POME storage tank 1, as illustrated, palm oil mill effluent (POME), which is finally discharged from the palm oil milling process, is introduced and stored.

As illustrated, the effluent storage tank 3 is connected by piping to the POME storage tank 1 and configured to receive and store the POME, wherein a heat exchanger 2 is installed on its pipeline so as to recover the waste heat of the POME.

The concentrator 7 is connected by piping to the effluent storage tank 3 and is configured to receive and concentrate the POME.

Herein, on its pipeline, a neutralizing agent dissolution tank 4 in which a neutralizing agent is dissolved and stored, and a coagulating agent dissolution tank 5 in which a coagulating agent is dissolved and stored are connected by piping, so that the concentration is carried out while receiving the neutralizing agent and the coagulating agent.

More specifically, one or two line mixers 6 are installed on its pipeline, and the neutralizing agent dissolution tank 4 and the coagulating agent dissolution tank each are connected to the line mixer 6, such that the neutralizing agent and the coagulating agent dissolved in the respective tanks can be mixed and stirred by the line mixer 6 on its pipeline through which the agents move from the effluent storage tank 3 to the concentrator 7.

Herein, a metering pump is installed so that the amount of the added agents is constant.

In addition, a pH adjusting tank is provided so that the neutralization can be completed while the POME, into which the neutralizing agent is added, remains in the pH adjusting tank for certain time.

Furthermore, the liquid phase contents and the sludge are primarily separated from the POME by passing through the concentrator 7.

As illustrated, the dehydrator is connected to the concentrator 7 and is configured to dehydrate the sludge from the concentrated POME so as to produce a POME decanter cake, wherein the liquid phase contents are separated from the sludge.

The dehydrator, as illustrated, can take the configuration wherein an air pressure dehydrator 8, a transfer conveyor 15, and a compression press 16 in the form of a belt press are successively arranged.

In addition, the separation of the liquid phase contents from the sludge is preferably performed at the compression press 16.

As illustrated, one side of the pressurized floating tank 11 is connected by piping to the concentrator 7, and its other side is connected by piping to the dehydrator, to store the liquid phase contents of the POME, which was separated by the concentrator 7 and the dehydrator, wherein on its pipeline, the coagulating agent dissolution tank 5 is connected to receive a coagulating agent, and on its upper part, a suspended material scraper is installed to remove suspended materials.

Herein, as illustrated, the pipe connected to the concentrator 7 and the pipe connected to the dehydrator are preferably transferred to buffer tanks (9, 17) and connected to the line mixer 10 through the transfer pump, wherein the coagulating agent dissolution tank 5 is preferably connected to the line mixer 10 so that the coagulating agent is supplied by a metering supply pump.

The pressurized floating tank 11 is configured to supply fine air, and the suspended material scraper installed on the upper part is configured to remove suspended materials which are present as particulates.

As illustrated, the suspended materials removed by the pressurized floating tank 11 are preferably transferred to the effluent storage tank 3.

Meanwhile, as illustrated, the aeration tank 13 is connected to the pressurized floating tank 11 through the buffer tank 12 and is configured to oxide organics while aerating the liquid phase contents purified through the pressurized floating tank 11 to produce a liquid fertilizer, wherein its one side is connected to a liquid fertilizer storage tank 14 to store the produced liquid fertilizer in the liquid fertilizer storage tank 14.

The decanter cake storage tank 18 is connected to the dehydrator to store a POME decanter cake produced at the dehydrator.

Furthermore, palm kernel shell (PKS) is stored in the PKS storage tank 20, palm oil decanter cake (PODC) is stored in the PODC storage tank 19, and palm kernel cake (PKC) is stored in the PKC storage tank 23.

As illustrated, the mixer 25 is connected to the decanter cake storage tank 18, the PKS storage tank 20, the PODC storage tank 19, and the PKC storage tank 23 and configured to mix the POME decanter cake, the PKS, the POD and the PKC.

Herein, a pulverizing device 21 and a pulverized PKS storage tank 22 are preferably further installed between the PKS storage tank 20 and the mixer 25 to supply the PKS, which is added into the mixer 25, in a pulverized state.

The screen 26 is connected to the mixer 25 and configured to sort impurities from the raw materials supplied from the mixer 25, and a pelletizer 27 is configured to pelletize the raw material that has passed through the screen 26.

In addition, the dryer 28 is configured to receive the pellet from the pelletizer 27 to dry, wherein one side of the dryer 28 is connected to the heat exchanger 2 to supply the waste heat of the POME, and at the other side, external air is introduced, wherein the hydrator is operated by the hot air blower 32 that supplies the heat generated by combusting fuel to the dryer 28.

Furthermore, one side of the multi-cyclone 29 is connected to a scrubber and its other side is connected to the dryer 28 so as to separate and discharge water and dust from the air including water and dust discharged from the dryer 28.

In addition to the above elements, the apparatus further comprises a pellet pulverizing device 30 configured to pulverize the pellet discharged from the dryer 28; and a powder storage tank 24 configured to store the pulverized pellet, wherein the powder storage tank 24 may be connected to the mixer 25 to further mix the pulverized pellet in the mixer 25.

Hereinafter, the method for processing final effluent and palm by-products discharged from the palm oil milling process according to the present invention comprising the above will be explained.

Figure 2:
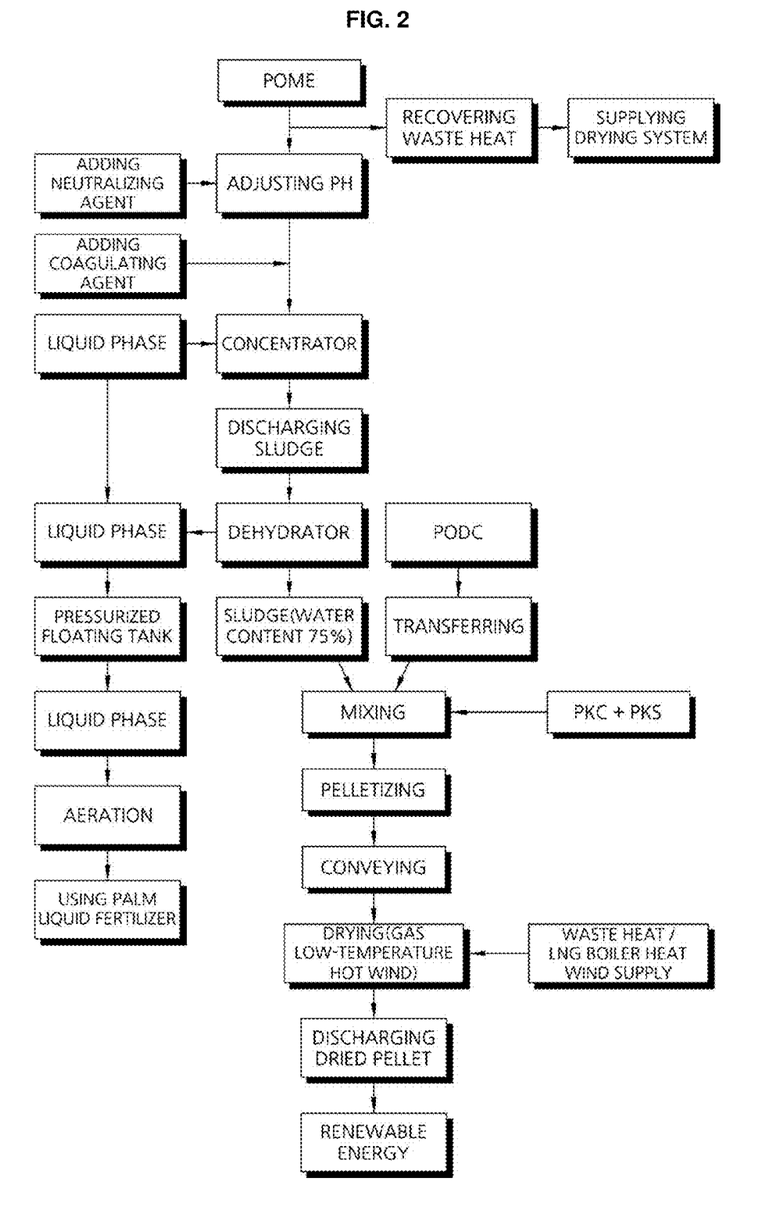
FIG. 2 is a step showing a method for processing final effluent and palm by-products discharged from a palm oil milling process according to the present invention.

The processing method according the present invention is carried out as illustrated in FIGS. 1 and 2.

1. Cooling Step

The waste heat of the palm oil mill effluent (POME), which is finally discharged from the palm oil milling process, is recovered and cooled using the heat exchanger 2.

More specifically, the POME is discharged at a high temperature of about 80° C. Thus, in order to use the POME, the heat exchanger 2 is installed between the POME storage tank 1 and the effluent storage tank 3 so as to use the waste heat.

Herein, at one side of the heat exchanger 2, external air is introduced, and the introduced external air is connected to the hot air blower 32 so as to use the waste heat for drying the pellet.

2. Neutralizing Step

A neutralizing agent is added into the cooled POME to adjust pH.

Herein, at the neutralizing step, the neutralizing agent is characterized by mixing and stirring the POME with any one selected from caustic soda, calcium hydroxide, calcium oxide, limestone, bentonite zeolite, and calcium hydroxide through the line mixer.

More specifically, the neutralizing agent is added into the neutralizing agent dissolution tank 4 the upper portion of which is provided with a hopper into which the neutralizing agent is added and which is provided with a stirrer connected to a motor therein. In addition, fresh water is added together with the neutralizing agent to dissolve the neutralizing agent, and the neutralizing agent dissolution tank 4 is connected by piping to the pipe connected from the effluent storage tank 3 to the concentrator 7 through the line mixer 6 so as to supply the neutralizing agent.

In addition, as explained above, the pH adjusting tank is provided as serving an intermediate storage tank for stabilizing and cooling the neutralizing effect, so that the neutralization is completed while allowing the POME, into which the neutralizing agent is added, to remain in the pH adjusting tank for a certain time.

3. Coagulating Agent Adding Step

A coagulating agent is added into the POME with adjusted pH.

At the coagulating agent adding step, the coagulating agent dissolution tank 5 is provided, and the coagulating agent dissolution tank 5 is connected by piping to the pipe connecting the effluent storage tank 3 to the concentrator 7 through the line mixer 6 to supply the coagulating agent.

In addition, the coagulating agent dissolution tank 5 is also configured to mix fresh water with the coagulating agent so as to perform the coagulating reaction while supplying the coagulating agent dissolved in the fresh water.

The coagulating agent dissolution tank 5 is preferably provided with a hopper on its upper portion so that the coagulating agent can be added in a constant amount, and a powder constant amount screw on which an inverter is mounted is interposed at its lower portion to mix and dissolve a constant amount of the coagulating agent with the fresh water.

Furthermore, it is preferable that several coagulating agent dissolution tanks 5 are provided and connected to each other, and on the other hands, the motor and the stirrer are installed so that the coagulating agent can be dissolved together with fresh water dissolved and added at each step sequentially at multiple stages.

When the coagulating agent is supplied to the POME by the line mixer 6 through the above steps, the coagulating agent is mixed and is reacted for a proper time while carrying out the coagulating reaction.

The coagulating agent for the above reaction is preferably polyacrylamide.

4. Concentration Step

The POME into which the coagulating agent is added is concentrated, wherein during the concentration process, the liquid phase contents are primarily separated from the POME.

The concentrator 7 is connected by piping to the effluent storage tank 3 and is configured to receive and concentrate the POME.

The concentrator 7 concentrates the POME coagulated at the coagulating step to primarily separate the sludge.

5. Dehydration Step

The POME passing through the concentration step is dehydrated to produce a POME decanter cake with the water content of 70 to 80%, wherein during the dehydration process, the liquid phase contents are secondarily separated.

The dehydration step is carried out by the aforementioned dehydrator. The dehydration is first carried out by the vertical air pressure dehydrator 8 connected to the concentrator 7, and the further dehydration is carried out at the transfer conveyor 15 followed by the air pressure dehydrator 8 and the compression press 16 connected to the transfer conveyor 15. Thereafter, the dehydrated sludge is transferred to the outside via a final screw conveyor.

6. Suspended Material Removal Step

A water tank, which is connected by piping, is interposed while supplying the coagulating agent to the liquid phase contents primarily separated at the concentration step and the liquid phase contents secondarily separated at the dehydration step, so as to add it to the pressurized floating tank 11 via the transfer pump to remove suspended materials.

To this end, as illustrated, one side of the pressurized floating tank 11 is connected by piping to the concentrator 7, and its other side is connected by piping to the dehydrator so as to receive the liquid phase contents in the POME therefrom and store them, wherein a suspended material scraper in a rotating belt transfer manner at upper portion of the pressurized floating tank 11 successively removes the suspended materials.

In addition, it is preferable that a microbubble generator is installed within the pressurized floating tank 11 so as to float a trace amount of solid contents unremoved in the liquid phase contents as bubbles.

Furthermore, as explained above, the coagulating agent dissolution tank 5 is connected on the pipeline so as to receive the coagulating agent to further coagulate the separated liquid phase contents, and to supply and press-float the coagulating agent to go past the buffer tanks (9, 17), so that at least 99% of the suspended materials is removed.

Furthermore, the coagulating agent dissolution tank 5 is connected by piping to the effluent storage tank 3 to transfer the suspended materials again thereto.

7. Liquid Fertilizer Production Step

Organics are oxidized while aerating the liquid phase contents, in which the suspended materials are removed, for 3 to 7 days to produce a liquid fertilizer.

To this end, an aeration tank 13 is provided as above to oxidize the organics while aerating the purified liquid phase through the pressurized floating tank 11 so as to produce a liquid fertilizer, wherein its one side is connected to the liquid fertilizer storage tank 14 to store the liquid fertilizer therein.

The stored liquid fertilizer is used as a liquid fertilizer of palm, etc.

8. Mixing Step

Palm kernel shell (PKS), palm oil decanter cake (PODC), palm kernel cake (PKC) are mixed with the POME decanter cake produced at the dehydration step.

To this end, as illustrated, the decanter cake storage tank 18 in which the POME decanter cake is stored, the PKS storage tank 20, the PODC storage tank 19, and the PKC storage tank 23 are provided, respectively, and they are all provided with the mixer 25 connected by piping so as to mix the respective raw materials at the mixer 25.

Herein, the PKC is used to adjust the total water content to be 60% or less since the water contents of the PODC and the PKS are 70% or more.

More specifically, the POME decanter cake which was subject to the dehydration step has water contents of 70% to 80%, the PODC is discharged at a temperature of about 80° C. and has water contents of about 75% or less, and the PKS also has water contents of 70% or more.

By contrast, since the PKC has water contents of about 10%, they are mixed to adjust the water content of the entire mixture to 40 to 60% so that it is suitable for pelletizing.

9. Pelletizing Step

Impurities are sorted from the mixed raw materials and added into the pelletizer 27 to be pelletized.

Herein, it is pelletized to have a diameter 5 to 20 mn and a length 15 to 50 mm.

10. Drying Step

The pellets produced at the pelletizer 27 is dried.

For drying, as explained above, a low temperature hot air dryer 28 is used, wherein the water content of the dried pellet is preferably less than 10%.

The temperature of the hot air is 50 to 150° C., and the relative humidity is 0 to 60%, preferably 40 to 60%.

Herein, part of the dried pellet is pulverized and transferred to the mixing step again to be used to adjust the humidity.

To this end, the water content of the mixer can be 40 to 60% by the pulverizing step of pulverizing the pellet dried at the drying step, and the mixing step of mixing the pulverized pellet powder.

In addition, the drying step is performed by generating hot air by receiving external air and fuel and combusting the fuel, and the hot air, the waste heat of the POME discharged through the heat exchanger 2, and the waste heat generated at a palm oil mill factory are mixed and used for drying at the dryer 28, wherein the temperature of the mixed hot air is 50 to 150° C., and the relative humidity is 0 to 60%, preferably 40 to 60%.

In addition, in the dryer 28, the amount of the introduced air is adjusted to induce the evaporation perspiration of the water while inducing the even evaporation of the water in the mixture, and the arrangement of a vent hole is adjusted so as to discharge the air constantly, thereby maximizing the moisture evaporation effect using the convection current of the air generated during the drying step, and the mechanical principle.

In addition, the air including moisture in the dryer 28 is immediately discharged through an outlet pipe formed at one side of the dryer 28, thereby further maximizing the drying efficiency, and drying it as descending sequentially, so that the dried construction can be easily discharged.

The pellet dried in such manner is introduced into the pellet storage tank 31 via a conveyor belt connected to the lower part of the dryer 28, and the pellet stored in the pellet storage tank 31 is utilized as combustion fuel of the hot air blower 32 or fuel for regeneration.

On the other hand, in the above constitution, if the POME decanter cake consists of the sludge having at least 1% of the oil content, it is preferable that the POME decanter cake and the dried pellet powders, and 0.05 to 3.0 wt. % alkali calcium hydroxide are mixed and then pelletized.

In order to confirm the effect of the present invention comprising the above constitution, the change of the POME pollution level before and after the separation of the solid contents. The results are shown in Table 1.

TABLE 1

Change of the POME pollution levels before and after the separation of solid contents

| Items | M Palm Oil Mill | | B Palm Oil Mill | |
|---|---|---|---|---|
| | Before separation | After separation | Before separation | After separation |
| COD(mg/l) | 123,000 | 39,800 | 89,000 | 25,000 |
| SS(mg/l) | 65,500 | 252 | 48,500 | 120 |
| T-N(mg/l) | 3,200 | 1,800 | 2,800 | 1,200 |
| T-P(mg/l) | 530 | 11 | 390 | 10 |

As shown in the Table 1, the POME generally contains 3 to 6% of solid contents. Here, it can be understood that if the solid contents are separated from the POME, the pollution levels sharply decreased.

In addition, soluble organics of the liquid phase contents separated from the solid contents are easy to be oxidized so that they are rapidly converted into a liquid fertilizer as shown in the present invention, thereby sharply reducing the burden of the treatment of the waste water, wherein the decanter cake is used as fuel of pellets, i.e. renewable energy.

TABLE 2

Water contents of dried pellets

| | POME Sludge decanter cake (water content(%)) | |
|---|---|---|
| Item | Before drying | After drying |
| M Palm Oil Mill | 75.6 | 9.1 |
| B Palm Oil Mill | 72.3 | 7.6 |
| I Palm Oil Mill | 77.3 | 5.4 |
| P Palm Oil Mill | 75.3 | 8.2 |

In particular, as shown in Table 2, the dried pellet has low water content as compared to that before drying and its treatment is simple. Also, as shown in Table 3, the energy content is very high, so this has a high value as renewable energy, and it is dried by various heat sources as explained above, so its economic feasibility is high.

The high energy content of the dried POME decanter cake is affected by the oil content remaining on some solid contents after milling palm oil, and this has an advantage in that oils remaining in the palm oil milling process can be all utilized.

TABLE 3

Energy contents of dried pellets (on the basis of a low-heating value)

| Item | POME Dried sludge heating value (kCal/kg, LHV) |
| --- | --- |
| M Palm Oil Mill | 5,625 |
| B Palm Oil Mill | 4,950 |
| I Palm Oil Mill | 5,210 |
| P Palm Oil Mill | 5,450 |

The effect of processing floating solid contents obtained from the present invention is the same as shown in Table 4.

TABLE 4

Effect of removing solid suspended materials according to the present invention

| Measurement frequency | Suspended materials (/l) | | Treatment efficiency (%) |
| --- | --- | --- | --- |
| | Introduction | Discharge | |
| 1th | 68,900 | 354 | 99.5 |
| 2nd | 55,350 | 495 | 99.1 |
| 3rd | 48,500 | 520 | 98.9 |
| 4th | 35,600 | 195 | 99.5 |
| Average | 52,087 | 391 | 99.2 |

As shown in Table 4, in the present invention, the treatment efficiency of floating solid contents was at least 99%.

As aforementioned, the present invention is applicable to sewage sludge, waste water sludge, paper mill sludge, dyeing sludge, slaughter waste water, food waste water, food and drink waste water, oil waste water, and the like.

What is claimed is:

1. A method for processing final effluent and palm by-products discharged from a palm oil milling process, comprising:
   a cooling step of recovering and cooling waste heat of the palm oil mill effluent (POME), which is finally discharged from the palm oil milling process, using a heat exchanger;
   a neutralizing step of adding a neutralizing agent into the cooled POME to adjust pH;
   a coagulating agent adding step of adding a coagulating agent into the POME with adjusted pH;
   a concentration step of concentrating the POME into which the coagulating agent is added, wherein in the concentration step, liquid phase contents are primarily separated from the POME;
   a dehydration step of dehydrating the POME passing through the concentration step to produce a POME decanter cake with a water content of 70 to 80%, wherein the liquid phase contents are secondarily separated;
   a suspended material removal step of supplying the coagulating agent to the liquid phase contents primarily separated at the concentration step and the liquid phase contents secondarily separated at the dehydration step so as to add it to a pressurized floating tank to remove suspended materials;
   a liquid fertilizer production step of oxidizing organics while aerating the liquid phase contents, in which the suspended materials are removed, for 3 to 7 days to produce a liquid fertilizer;
   a mixing step of mixing palm kernel shell (PKS), palm oil decanter cake (PODC), and palm kernel cake (PKC) with the POME decanter cake produced at the dehydration step;
   a pelletizing step of sorting impurities from mixed raw materials of the mixing step and pelletizing them to be pelletized; and
   a drying step of drying the pellet produced at the pelletizing step.

2. The method as claimed in claim 1, further comprising: pulverizing the pellet dried at the drying step and characterized in that the pulverized pellet powders are mixed at the mixing step to have a water content of 40 to 60%.

3. The method as claimed in claim 1, wherein the drying step is performed by generating hot air by receiving external air and fuel and combusting the fuel, and the hot air, the waste heat of the POME discharged through the heat exchanger, and waste heat generated at a palm oil mill factory are mixed and used for drying at the drying step, wherein the temperature of the mixed hot air is 50 to 150° C., and the relative humidity is 0 to 60%.

4. The method as claimed in claim 1, characterized in that in the neutralizing step, the neutralizing agent mixes and stirs the POME with any one selected from caustic soda, calcium hydroxide, calcium oxide, limestone, bentonite zeolite, and calcium hydroxide through a line mixer.

5. The method as claimed in claim 1, characterized in that in the dehydration step, the POME decanter cake consists of sludge having at least 1% of oil contents, wherein the POME decanter cake is mixed with dried pellet powder and alkaline calcium hydroxide and then is pelletized.

6. An apparatus for processing final effluent and palm by-products discharged from a palm oil milling process, comprising:
   a POME storage tank in which palm oil mill effluent (POME), which is finally discharged from the palm oil milling process, is introduced and stored;
   an effluent storage tank being connected by piping to the POME storage tank and configured to receive and store the POME, wherein a heat exchanger is installed on its pipeline so as to recover waste heat of the POME;
   a concentrator being connected by piping to the effluent storage tank and configured to receive and concentrate the POME, wherein a neutralizing agent dissolution tank, in which a neutralizing agent is dissolved and stored, and a coagulating agent dissolution tank in which a coagulating agent is dissolved and stored, are connected by piping on its pipeline so that the concentration is carried out while receiving the neutralizing agent and the coagulating agent, wherein liquid phase contents and sludge are separated from the POME;
   a dehydrator being connected to the concentrator and configured to dehydrate the sludge in the concentrated POME to produce a POME decanter cake, wherein liquid phase contents are separated from the sludge;
   a pressurized floating tank, one side of which being connected by piping to the concentrator and another side of which being connected by piping to the dehydrator, the pressurized floating tank being configured to store the liquid phase contents in the POME, which was separated by the concentrator and the dehydrator, wherein on its pipeline, the coagulating agent dissolution tank is connected to receive the coagulating agent, and on its upper part, a suspended material scraper is installed to remove suspended materials;

an aeration tank being connected to the pressurized floating tank and configured to oxide organics while aerating the liquid phase contents purified through the pressurized floating tank to produce a liquid fertilizer, wherein a liquid fertilizer storage tank is connected at its one side to store the produced liquid fertilizer therein;

a decanter cake storage tank being connected to the dehydrator and configured to store the POME decanter cake produced at the dehydrator;

a PKS storage tank in which palm kernel shell (PKS) is stored;

a PODC storage tank in which palm oil decanter cake (PODC) is stored;

a PKC storage tank in which palm kernel cake (PKC) is stored;

a mixer being connected to the decanter cake storage tank, the PKS storage tank, the PODC storage tank, and the PKC storage tank, and configured to mix the POME decanter cake, the PKS, the PODC, the PKC;

a screen being connected to the mixer and configured to sort impurities from raw materials supplied from the mixer;

a pelletizer configured to pelletize the raw materials that have passed through the screen;

a dryer configured to receive the pellets from the pelletizer and dry the pellets;

a hot air blower being connected at its one side to the heat exchanger to supply the waste heat of the POME and having another side, in which external air is introduced, wherein the heat generated by combusting fuel is supplied to the dryer; and a multi-cyclone, one side of which being connected to a scrubber and another side of which being connected to the dryer, the multi-cyclone being configured to separate and discharge water and dust from the air including water and dust discharged from the dryer.

7. The apparatus as claimed in claim 6, further comprising:

a pellet pulverizing device configured to pulverize the pellet discharged from the dryer; and a powder storage tank configured to store the pulverized pellet, characterized in that the powder storage tank is connected to the mixer so as to further mix the pulverized pellet at the mixer.

* * * * *